(12) United States Patent
Xu et al.

(10) Patent No.: US 10,311,704 B1
(45) Date of Patent: Jun. 4, 2019

(54) PASSENGER-RELATED ITEM LOSS MITIGATION

(71) Applicant: Futurewei Technologies, Inc., Plano, TX (US)

(72) Inventors: Qijie Xu, Santa Clara, CA (US); Fatih Porikli, San Jose, CA (US); Junqiang Shen, Shanghai (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/939,984

(22) Filed: Mar. 29, 2018

(51) Int. Cl.
| | |
|---|---|
| *G08B 21/24* | (2006.01) |
| *G06T 7/11* | (2017.01) |
| *G06K 9/32* | (2006.01) |
| *G06K 9/00* | (2006.01) |
| *G06F 3/16* | (2006.01) |
| *H04L 12/58* | (2006.01) |

(52) U.S. Cl.
CPC ............ *G08B 21/24* (2013.01); *G06F 3/167* (2013.01); *G06K 9/00832* (2013.01); *G06K 9/3233* (2013.01); *G06T 7/11* (2017.01); *H04L 51/38* (2013.01); *G06T 2207/20021* (2013.01)

(58) Field of Classification Search
CPC . G08B 21/24; G06T 7/11; G06T 2207/20021; G06F 3/167; G06K 9/00832; G06K 9/3233; H04L 51/38
See application file for complete search history.

(56) References Cited

U.S. PATENT DOCUMENTS

| | | | |
|---|---|---|---|
| 6,768,420 B2 | 7/2004 | McCarthy et al. | |
| 7,720,580 B2 | 5/2010 | Higgins-Luthman | |
| 8,289,142 B2 | 10/2012 | Pawlicki et al. | |
| 2016/0238700 A1 | 8/2016 | Matsuura et al. | |
| 2016/0332535 A1* | 11/2016 | Bradley | B60N 2/002 |
| 2017/0098364 A1 | 4/2017 | Jaegal | |

(Continued)

FOREIGN PATENT DOCUMENTS

| | | |
|---|---|---|
| CN | 101937609 A | 1/2011 |
| CN | 205486689 U | 8/2016 |

(Continued)

OTHER PUBLICATIONS

Noh, et al., "Learning Deconvolution Network for Semantic Segmentation," 2015 IEEE International Conference on Computer Vision (ICCV) (2015), Santiago, Chile, Dec. 7, 2015-Dec. 13, 2015, pp. 1520-1528.

(Continued)

*Primary Examiner* — Sisay Yacob
(74) *Attorney, Agent, or Firm* — Conley Rose, P.C.

(57) ABSTRACT

A method and device for mitigating passenger-related item loss in a travel-for-hire context are disclosed. An item within a vehicle passenger region is identified, and associated the identified item with a passenger identified by a passenger identifier. A vehicle cabin inventory database is updated with an entry based on the identified item associated with the passenger identifier. A presence of the identified item is detected within the vehicle cabin passenger region when a passenger exit event occurs, and message data is generated including the entry that relates to the identified item based on the presence of the identified item within the vehicle cabin passenger region.

20 Claims, 7 Drawing Sheets

(56) References Cited

U.S. PATENT DOCUMENTS

2017/0175431 A1  6/2017 Bradley et al.
2017/0284147 A1* 10/2017 Bradley ................ B60N 2/002

FOREIGN PATENT DOCUMENTS

| CN | 106560836 A | 4/2017 |
|---|---|---|
| JP | 2006338535 A | 12/2006 |
| JP | 2008262459 A | 10/2008 |
| JP | 2010182189 A | 8/2010 |

OTHER PUBLICATIONS

Donahue, et al., "Long-term Recurrent Convolutional Networks for Visual Recognition and Description," 2015 IEEE Conference on Computer Vision and Pattern Recognition (CVPR) (2015), Boston, MA, USA, Jun. 7, 2015 to Jun. 12, 2015, pp. 2625-2634.

Johnson, et al., "DenseCap: Fully Convolutional Localization Networks for Dense Captioning," 2016 IEEE Conference on Computer Vision and Pattern Recognition (CVPR) (2016) Las Vegas, NV, United States, Jun. 27, 2016 to Jun. 30, 2016, pp. 4565-4574.

Liu, et al., "SSD: Single Shot MultiBox Detector," arXiv:1512.02325v5 [cs.CV] Dec. 29, 2016, pp. 1-17.

"VE352—Left and Removed Item Detection," http://www.aimetis.com/webhelp/Symphony/6.13/enVE352_-_Left_and_Removed_Item_Detection.htm, 2014, 7 pages.

"VE350 Outdoor Left Item Detection," http://www.aimetis.com/webhelp/symphony/v6/en/Video_Analytics/VE350_Lef_Item_Detection.htm, 2014, 3 pages.

Machine Translation and Abstract of Chinese Publication No. CN101937609, Jan. 5, 2011, 14 pages.

Machine Translation and Abstract of Chinese Publication No. CN205486689, dated Aug. 17, 2016, 5 pages.

Machine Translation and Abstract of Japanese Publication No. JP2006338535, dated Dec. 14, 2006, 14 pages.

Machine Translation and Abstract of Japanese Publication No. JP2008262459, dated Oct. 30, 2008, 22 pages.

Machine Translation and Abstract of Japanese Publication No. JP2010182189, Aug. 19, 2010, 17 pages.

Foreign Communication From a Counterpart Application, PCT Application No. PCT/CN2019/073036, English Translation of International Search Report dated Mar. 4, 2019, 6 pages.

Foreign Communication From a Counterpart Application, PCT Application No. PCT/CN2019/073036, English Translation of Written Opinion dated Mar. 4, 2019, 4 pages.

* cited by examiner

PASSENGER-RELATED ITEM LOSS MITIGATION

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Generally, various computer devices provide a platform for object recognition in different environments. With respect to vehicle devices, object recognition has been implemented in autonomous applications in which a vehicle may use vehicle sensor devices to sense and avoid objects in a traffic environment. Also, within the vehicle cabin, vehicle sensor devices have been used to augment driver operations, such as eye tracking technologies to assess the driver's attention to vehicle user interfaces (such as music control, lighting, environmental control, etc.), and to adjust, or present, different graphic user interfaces based on past driver preferences.

As processing power and sensor device sensitivity improve, other such applications can be implemented for use within a vehicle cabin environment.

SUMMARY

In an embodiment, the disclosure includes a method of mitigating passenger-related item loss in a travel-for-hire context. The method includes identifying an item within a vehicle cabin passenger region, associating the identified item with a passenger identified by a passenger identifier, updating a vehicle cabin inventory database with an entry based on the identified item associated with the passenger identifier, detecting a presence of the identified item within the vehicle cabin passenger region when a passenger exit event occurs, and generating message data including the entry that relates to the identified item based on the presence of the identified item within the vehicle cabin passenger region.

Optionally, in any of the preceding aspects, another implementation of the aspect provides that identifying the item includes capturing an image of the vehicle cabin passenger region, identifying a region-of-interest of the image, wherein the region-of-interest is based on a detection confidence metric relating to the vehicle cabin region, upsampling the region-of-interest to produce an upsampled region-of-interest, the upsampled region-of-interest to promote image recognition, and performing image recognition of the upsampled region-of-interest of the image to identify the item within the vehicle cabin passenger region. Optionally, in any of the preceding aspects, another implementation of the aspect provides that capturing an image of the vehicle cabin passenger region occurs upon a passenger entry event. Optionally, in any of the preceding aspects, another implementation of the aspect provides that identifying the item with the vehicle cabin passenger region includes verifying the identified item as the passenger-related item. Optionally, in any of the preceding aspects, another implementation of the aspect further provides for verbally announcing the message data via an announcement device. Optionally, in any of the preceding aspects, another implementation of the aspect provides for announcing the message data. Optionally, in any of the preceding aspects, another implementation of the aspect provides that the announcing the message data includes at least one of: transmitting a text message based on the passenger identifier for receipt by a handheld mobile device, transmitting the message data based on the passenger identifier for receipt by a client application of the handheld mobile device, or transmitting the message data based on the passenger identifier as a universal resource locator (URL) link for receipt by a user device. Optionally, in any of the preceding aspects, another implementation of the aspect provides that the passenger exit event is based on at least one of: camera device data, or vehicle door sensor data.

In an embodiment, the disclosure includes a vehicle control unit for in-vehicle tracking of an item. The vehicle control unit includes a memory containing instructions, and a processor coupled to the memory, the processor configured to execute the instructions stored in the memory to cause the processor to identify an item within a plurality of vehicle cabin passenger regions, associate the identified item with a passenger identified by a passenger identifier, update a vehicle cabin inventory database with an entry including the identified item associated with the passenger identifier, detect a presence of the identified item within the plurality of vehicle cabin passenger regions when a passenger exit event occurs, and generate message data with the entry relating to the identified item based on the presence of the identified item within the plurality of vehicle cabin passenger regions.

Optionally, in any of the preceding aspects, another implementation of the aspect provides further instructions stored in memory to cause the processor to identify the item by capturing an image of a vehicle cabin passenger region of the plurality of vehicle cabin passenger regions, identifying a region-of-interest of the image, wherein the region-of-interest is based on a detection confidence metric relating to the vehicle cabin passenger region of the plurality of vehicle cabin passenger regions, upsampling the region-of-interest to produce an upsampled region-of-interest, the upsampled region-of-interest to promote image recognition, and performing image recognition of the upsampled region-of-interest of the image to identify the item within the vehicle cabin passenger region. Optionally, in any of the preceding aspects, another implementation of the aspect provides that identifying the item within the plurality of vehicle cabin passenger regions includes verifying the identified item as a passenger-related item. Optionally, in any of the preceding aspects, another implementation of the aspect provides further instructions stored in memory to cause the processor to verbally announce the message data via a user interface. Optionally, in any of the preceding aspects, another implementation of the aspect provides further instructions stored in memory to cause the processor to transmit the message data by at least one of a text message based on the passenger identifier for receipt by a handheld mobile device, a client application based on the passenger identifier for receipt by a client application of the handheld mobile device; or a universal resource locator (URL) link for receipt by a user device. Optionally, in any of the preceding aspects, another implementation of the aspect provides that the passenger exit event is based on at least one of camera device data; or vehicle door sensor data. Optionally, in any of the preceding aspects, another implementation of the aspect provides that the passenger identifier includes at least one of a username, an international mobile equipment identity (IMEI) number, or an electronic serial number (ESN).

In an embodiment, the disclosure includes a method of mitigating passenger-related item loss, the method including identifying, via image recognition, an item within vehicle cabin passenger regions as a passenger-related item, associating the item with a passenger identified by a passenger identifier when the item is a passenger-related item, updating a vehicle cabin inventory database entry with the passenger identifier and the passenger-related item, detecting a presence of the passenger-related item within the vehicle cabin passenger regions when a passenger exit event occurs, generating message data based on the presence of the passenger-related item within the vehicle cabin passenger regions and based on the vehicle cabin inventory database entry, and transmitting the message data for alerting the passenger identified by the passenger identifier.

Optionally, in any of the preceding aspects, another implementation of the aspect provides that identifying the item includes capturing an image of the vehicle cabin passenger regions, identifying a region-of-interest of the image, wherein the region-of-interest is based on a detection confidence metric relating to within the vehicle cabin passenger regions, upsampling the region-of-interest to produce an upsampled region-of-interest, wherein the upsampled region-of-interest provides an enhanced focus to promote image recognition, and performing the image recognition of the upsampled region-of-interest of the image to identify the item within the vehicle cabin passenger regions. Optionally, in any of the preceding aspects, another implementation of the aspect provides that transmitting the message data includes at least one of transmitting a text message based on the passenger identifier for receipt by a handheld mobile device, transmitting the message data based on the passenger identifier for receipt by a client application of the handheld mobile device, or transmitting the message data based on the passenger identifier as a universal resource locator (URL) link for receipt by a user device. Optionally, in any of the preceding aspects, another implementation of the aspect provides that the passenger exit event is based on at least one of camera device data, or vehicle door sensor data. Optionally, in any of the preceding aspects, another implementation of the aspect provides that the passenger identifier includes at least one of a username, an international mobile equipment identity (IMEI) number, or an electronic serial number (ESN).

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Image processing techniques can be used to detect items in a timely manner within a shared vehicle environment, or vehicle-for-hire environment, such as taxis services, vehicle-sharing applications, ride-share, etc., in which passengers may unintentionally leave behind personal items such as, but not limited to, their wallet, credit card, purse, briefcase, hair brush, common pocket items, etc. A vehicle can be understood to refer to a mobile machine that transports people, such as, for example, cars, trucks, buses, railway cars, watercraft, aircraft, etc.

Though environment monitoring can detect items, such as unidentified items appearing on a passenger seat, such monitoring has not been capable of identifying the item—for example whether the item may be a nonconsequential piece of trash or debris as opposed to an item having an intrinsic value to a passenger, such as the personal items mentioned above.

Another complication with unintentionally left-behind items is the time taken to determine the ownership. When ownership can be determined, then the further complication becomes the time and resources required to locate and return the item to the proper owner, which results in a loss of generating ride fares or other revenue-generating activities.

Because of the increasing ease in which prospective passengers can arrange a ride through their smartphones, a corresponding increase results in unintentionally left-behind items and inconvenience to the passenger and to the driver. During travel to a destination, passengers have the need to take out personal objects. Once at a destination, however, the passenger may forget or overlook items taken out during the ride. Also, sometimes, passengers may have some objects accidentally slip out of their pockets or purses without the passenger's knowledge. Lesser items, such as hair brushes, magazines, etc., may still have an intrinsic convenience value to a passenger because, for example, the inconvenience, time and expense to find and repurchase such items. These personal items are important items, and passengers desire to have their timely return, or better yet, not lose track of the item in the first place.

Disclosed herein are a method and device for mitigating passenger-related item loss, such as, but not limited to in a travel-for-hire context, that can identify passenger items and can provide reminders or alerts to notify the passenger regarding identified items remaining behind with the vehicle upon their exit.

Figure 1:
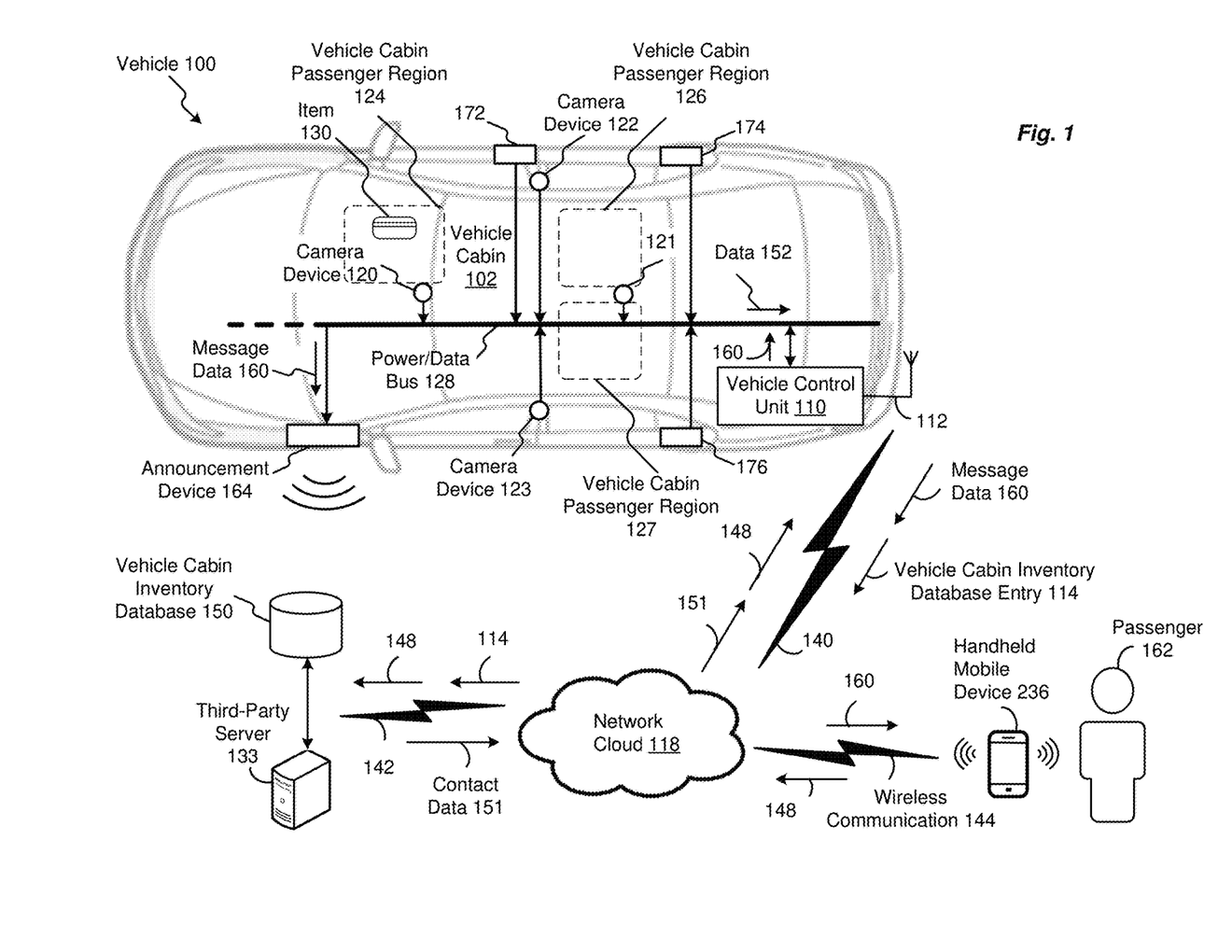
FIG. 1 is a schematic illustration of a vehicle including a vehicle control unit.

FIG. 1 is a schematic illustration of a vehicle 100 that includes a vehicle control unit 110. Camera devices 120, 121, 122 and 123 and vehicle door sensor devices 172, 174 and 176 are in communication with the vehicle control unit 110 to provide passenger-related item loss mitigation of the present disclosure.

Generally, when a passenger 162 desires a vehicle ride, the passenger 162 can access a ride-sharing application loaded on their handheld mobile device 236. Examples of handheld mobile device 236 can include cell phones, smart phones, personal digital assistant (PDA) devices, tablet computer, e-readers, etc. Examples of ride-sharing applications include those provided by service providers Uber, Lyft, etc.

To request a vehicle-for-hire, or ride share, the passenger 162 has an account profile, which includes the passenger's contact data 151, associated with the application services. Contact data 151 may include, for example, passenger information such as full name, address, age, member number, mobile phone number, email address, etc.

The contact data 151 can be accessed with a passenger identifier 148, which includes a unique identifier assigned to the passenger 162 and/or their handheld mobile device 236 by the system of the present disclosure. For example, the passenger identifier 148 may include a username of the passenger 162, an international mobile equipment identity (IMEI) number or an electronic serial number (ESN) of the passenger's handheld mobile device 236, and/or other unique identifiers relating to the passenger 162 and/or their handheld mobile device 236.

When a passenger 162 requests, through their handheld mobile device 236, a vehicle ride, the passenger identifier 148 is provided to a third party server 133 via a wireless communication 144 and 142 coupled with a network cloud 118. In response, a vehicle ride is arranged with vehicle 100 for the passenger 162 through a driver-oriented application, which specifies, for example, pickup coordinates and contact data 151 for the passenger 162.

The passenger identifier 148 and contact data 151 can be conveyed to the vehicle control unit 110 via wireless communication 140 through the antenna 112. The wireless communication 140 extends to wireless communication 142 and 144 through the network cloud 118. Such wireless communications range from national and/or international cellular telephone systems to the Internet to point-to-point in-home wireless networks to radio frequency identification (RFID) systems. Each type of communication system is constructed, and hence operates, in accordance with one or more communication standards. For instance, wireless communication systems may operate in accordance with one or more standards including, but not limited to, 3rd Generation Partnership Project (3GPP), 4th Generation Partnership (4GPP), 5th Generation Partnership Project (5GPP), long term evolution (LTE), LTE Advanced, RFID, Institute of Electrical and Electronics Engineers (IEEE) 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

During the trip in the vehicle 100, the vehicle control unit 110 may operate to monitor items in the vehicle cabin 102 through the camera devices 120, 121, 122 and 123. Each camera device 120, 121, 122 and 123 can be assigned, through the vehicle control unit 110, to monitor one or several of the vehicle cabin passenger regions 124, 126 and/or 127. Also, each of the camera devices 120, 121, 122 and 123 can be located within the vehicle cabin 102 to capture different views, such as side views or top views, of vehicle cabin passenger regions 124, 126, and/or 127. In the example of FIG. 1, the vehicle 100 is presented as a passenger sedan with at least four seating positions—a passenger-side front seat, a passenger-side rear seat, a driver-side rear seat, and a driver/operator seat located at a driver-side front seat.

The term camera or camera device is used herein to represent any optical instrument for recording or capturing images, which may be stored locally at the device, transmitted to another location such as vehicle control unit 110 via the power/data bus 128, or both. The images may include individual still-photographs, or sequences of images for generating video. The video can be stored locally with the camera or camera device, transmitted and/or streamed to the vehicle control unit 110 in a compressed video format, such as MPEG-2 Part 2, MPEG-4 Part 2, H.264 (MPEG-4 Part 10), High Efficiency Video Coding (HEVC), Theora, RealVideo RV40, VP9, AV1, etc.

In the example of FIG. 1, passenger 162 occupies the front-passenger seat, which corresponds with vehicle cabin passenger region 124. For clarity of explanation, an illustration of a seated passenger in the vehicle cabin passenger region 124 is not shown. Camera device 122 is located on a door frame of the vehicle 100 and has a side field-of-view of the vehicle cabin passenger region 124. Camera device 120 is located on the ceiling of the vehicle 100 and has a top field-of-view of the vehicle cabin passenger region 124. Note that the camera devices can be placed anywhere within the vehicle cabin 102 so as to capture any angle and/or area of the interior to identify passenger items.

Camera devices 120 and 122 may capture images of the vehicle cabin 102, and generate data 152 that can be utilized by the vehicle control unit 110 to determine an identification of an item, such as the item 130 located in the vehicle cabin passenger region 124. Once identified, the vehicle control unit 110 operates to associate an identified item, such as item 130, with the passenger 162 identified by the passenger identifier 148, and operates to update a vehicle cabin inventory database 150 with a vehicle cabin inventory database entry 114 based on the identified item 130. The vehicle control unit 110 associates item 130 with the passenger 162 based on location, time of coincidence of the passenger 162 and the item 130. For example, the time in which a passenger coincides with a vehicle-for-hire based on image timestamps, payment timestamps, scheduled pickup times, etc. The time of coincidence with an item may be considered when the item 130 appears corresponding with that of passenger's presence in the vehicle 100.

Also, each camera device 120, 121, 122 and 123 can operate at visible and/or non-visible light spectrums, so that images of vehicle cabin passenger regions 124, 126 and/or 127 can be captured in favorable and/or unfavorable lighting conditions within the vehicle cabin 102.

Vehicle door sensor devices 172, 174 and 176 operate to sense a passenger exit and/or entry event. In the example of FIG. 1, each of the vehicle door sensor devices 172, 174 and 176 correspond with the vehicle cabin passenger region 124, 126 and 127, respectively. An example of the passenger exit and/or event includes the vehicle door sensor devices 172, 174 and 176 sensing a vehicle passenger door latch transitioning from a latched state to an unlatched state.

For example, when the vehicle 100 reaches a passenger pick-up point, or arrives at a destination, the passenger 162 (or a driver) opens a front-passenger door of the vehicle 100. Upon sensing the passenger entry event upon passenger pick-up, or exit event upon reaching a destination, the vehicle door sensor device 172 in this example is operable to generate data 152 indicative of the respective entry and/or exit event. The data 152 can be delivered to the vehicle control unit 110 via the power/data bus 128.

The camera devices 120, 121, 122 and 123, the vehicle door sensor devices 172, 174 and 176, and the vehicle control unit 110 can be coupled by a power/data bus 128 including a combination of network architectures such as a Body Electronic Area Network (BEAN), a Controller Area Network (CAN) bus configuration, an automotive Ethernet Local Area Network (LAN) automotive Wireless LAN configuration, and/or other communication system architectures to provide communications between devices and systems of the vehicle 100.

As may be appreciated, in an autonomous vehicle, the driver's seat area (for example, the front-driver side seat) can provide an additional vehicle cabin passenger region as consequently may be configured. Further, a fewer or greater number of vehicle cabin passenger regions can correspond to the seating capacity for the model of the vehicle 100.

In the present disclosure, the item 130 within the vehicle cabin passenger region 124 is identified through image recognition processing executable by the vehicle control unit 110. Image recognition processing can be implemented by machine learning techniques, which are discussed in detail with reference to FIGS. 2 and 3.

When a passenger exit event occurs, as indicated by vehicle door sensor devices 172, 174, and/or 176, the vehicle control unit 110 operates to detect a presence of the identified item 130 within the vehicle cabin passenger region 124, and generates message data 160. The message data 160 includes the vehicle cabin inventory database entry 114 that relates to the detected item 130, and also includes contact data 151.

The message data 160 can be used to notify the passenger 162 of the identified item 130 being left behind in the vehicle 100. The alert can be via the handheld mobile device 236, which may receive a text message (including haptic vibrations, noise alerts, visual graphic alerts, etc.) to alert the passenger 162 to the item 130. The alert can also be via an announcement device 164 of the vehicle 100, including an audio and/or visual alert to draw the attention of the passenger 162 to the item 130. In operation, the vehicle control unit 110 mitigates passenger-related item loss in a travel-for-hire context.

As may be appreciated, the vehicle control unit 110 can operate to monitor the vehicle cabin passenger regions 124, 126 and/or 127 on a continuous and/or periodic basis during travel in the vehicle 100 because the location of the item 130 may not be static. The passenger 162 may intentionally and/or unintentionally move or handle items, such as the item 130 in the vehicle cabin passenger region 124, or in other vehicle cabin passenger regions 126 and/or 127. Accordingly, the vehicle control unit 110 is configured to re-identify the item 130, or track the item 130 during vehicle travel.

When the vehicle control unit 110 operates on periodic basis, the vehicle control unit 110 may be referred to as a passive detection mode operation, which is described in detail with reference to FIG. 7. When the vehicle control unit 110 operates on a continuous basis, the vehicle control unit 110 may be referred to as an active detection mode operation, which is described in detail with reference to FIG. 6. As may be appreciated, the passive detection mode operation requires less computing resources of the vehicle control unit 110, and less electric power, to monitor the vehicle cabin passenger regions 124, 126 and/or 127, while the active detection mode operation requires greater computing resources of the vehicle control unit 110, and greater electric power, to monitor the cabin passenger regions 124, 126 and/or 127.

Figure 2:
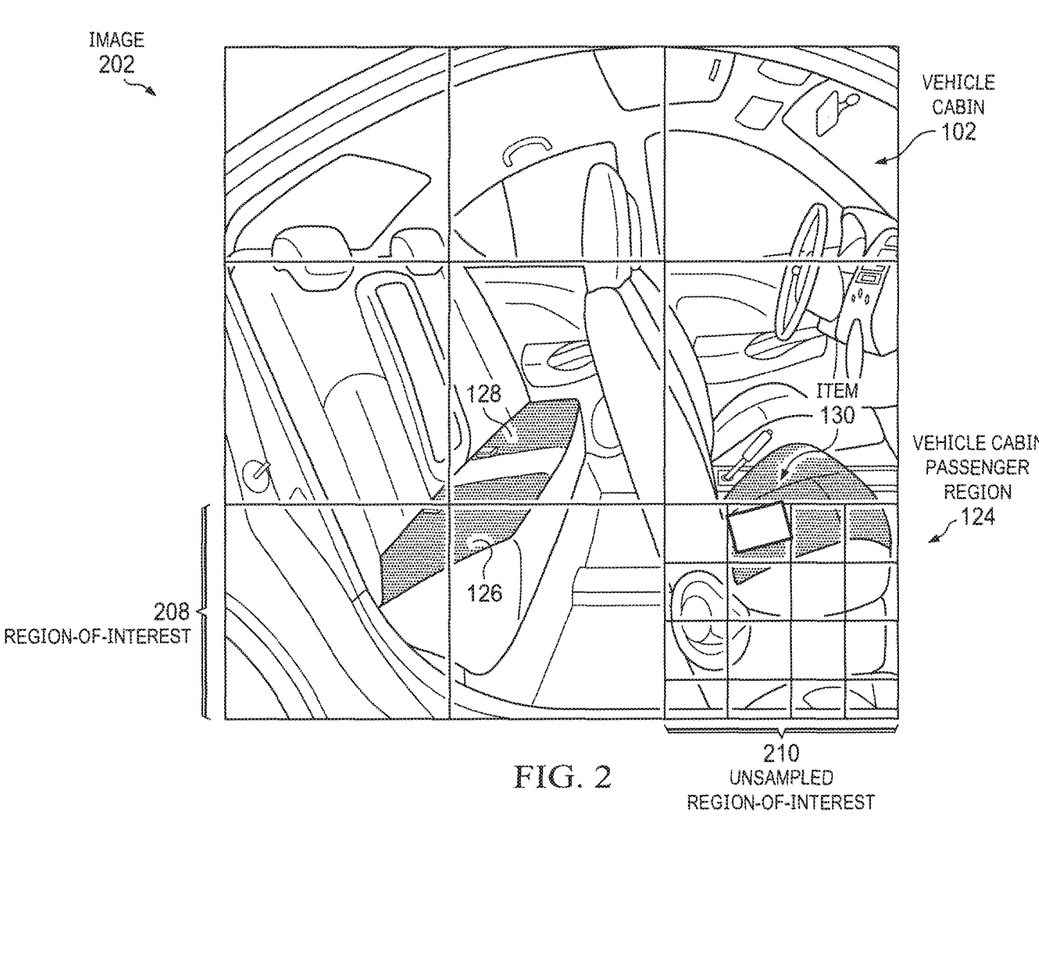
FIG. 2 depicts an example side view image of a vehicle cabin captured by a camera device of the vehicle.

FIG. 2 depicts an example side view image 202 of a vehicle cabin 102, as may be captured by a camera device of the vehicle 100, such as camera device 122 of FIG. 1. The perspective of FIG. 2 operates to illustrate the example of image recognition of an item 130 that is obscured, or not-readily recognizable positions that may complicate image recognition. The item 130 may be, for example, a passenger's credit card face down in a vehicle cabin passenger region 124 such that an edge perspective may be captured by the image 202. Image recognition is generally based on the detection of edge boundaries within an image. For example, edge boundaries for a credit card form a general rectangle in different positions or orientations with respect to a camera device.

For image processing, the image 202 can be defined as multiple regions 206. Of these, regions-of-interest 208 may be defined as those with elevated confidence metrics, such as region 206(1,1), 206(2,1), 206(3,1), etc. In the example of FIG. 2, the regions-of-interest 208 form matrix blocks; however, regions-of-interest can be scaled to coarser or finer granularity to provide manageable blocks for image processing. Because a passenger-related item is not bound to a fixed location within the vehicle cabin passenger region 124, image recognition techniques may incorporate machine learning techniques, which are discussed in detail in FIG. 3.

As may be appreciated, various image recognition strategies may be implemented for recognition of an item within a vehicle cabin passenger region. For example, image recognition techniques can be appearance-based in view of an item's specific features, can be implemented by an interpretation tree, which is a depth-first search technique for model matching, can be implemented by pattern, or template, matching for simpler items, or can be implemented by artificial neural networks inspired by biological neural networks.

Initially, conventional neural networks have been used, but proved overly cumbersome in their implementation. As techniques and technologies evolved, convolutional neural networks have been developed to take advantage of a general aspect of an image, which is the principle that proximity is strongly correlated with similarity. For example, two pixels that are near one another in a given image are more likely to be related than two pixels that are further apart.

To improve neural network efficiency, convolution operates to eliminate less important connections, causing image processing to become computationally manageable by filtering connections by proximity. A convolutional neural network restricts connections so that a neuron of the network only accepts inputs from a small subsection of a given image layer (for example, 3×3×1 or 5×5×1 pixels). Accordingly, the image is divided into manageable portions to promote greater efficiency in processing for overall visual image recognition.

In operation, an image 202 is captured that includes the vehicle cabin passenger regions 124, 126 and/or 127 broken down into regions 206. Regions 206 can be designated on a column/row basis, such as (x, y). A region-of-interest 208 is identified in the image 202, where the region-of-interest 208 is based on a detection confidence metric corresponding with at least one of the vehicle cabin passenger regions 124, 126 and/or 127 and one of the regions 206. Those regions 206 not including vehicle cabin passenger regions 124, 126 and/or 127 by default have lower or negligible confidence metrics, such as top row regions 206(1,3), 206(2,3), 206(3,3) not correlating, generally, with a vehicle cabin passenger region. Of the remaining regions 206, those with items provide an elevated detection confidence metric with respect to regions-of-interest 208 without items being detected.

The detection confidence metric relates to the probability, or likelihood, that an object identified through image recognition techniques is accurately identified or identifiable. Generally, the detection confidence metric is heuristic in nature and subject to improvement through additional training data, feedback data, and real-world application and resulting feedback to the specific image recognition technique. For example, a convolutional neural network can operate to learn be gradient descent, in which each layer of the neural network feeds from a layer below to build hierarchical features that may adapt to solve, that is recognize, an object at a high detection confidence metric.

With respect to image processing—a convolutional neural network may engage in machine learning through volumes of training data. Also, over time, a convolutional neural network may self-learn upon exposure to different data that portrays items in different perspectives and/or orientations. In turn, in applying image recognition, the detection confidence metric relays that varying pixel densities that are likely, or probabilistically, recognizable as one of many items.

The region-of-interest 208 is upsampled to produce an upsampled region-of-interest 210, which in effect brings into further pixel focus the region-of-interest 208. In this respect, resources of the vehicle control unit 110 are focused on the upsampled region-of-interest to perform image recognition of the upsampled performing image recognition of the upsampled region-of-interest 208 of the image 202 to identify the item 130 within the vehicle cabin passenger region 124. Further, machine learning techniques may be implemented to further delineate items into basic classes. An example is a class of passenger-related items, such as those associated with travel-for-hire passengers, and another class being non-passenger-related items, such as items of the vehicle operator. Using the image processing techniques described above, items such as item 130 may be readily detected and identified.

Figure 3:
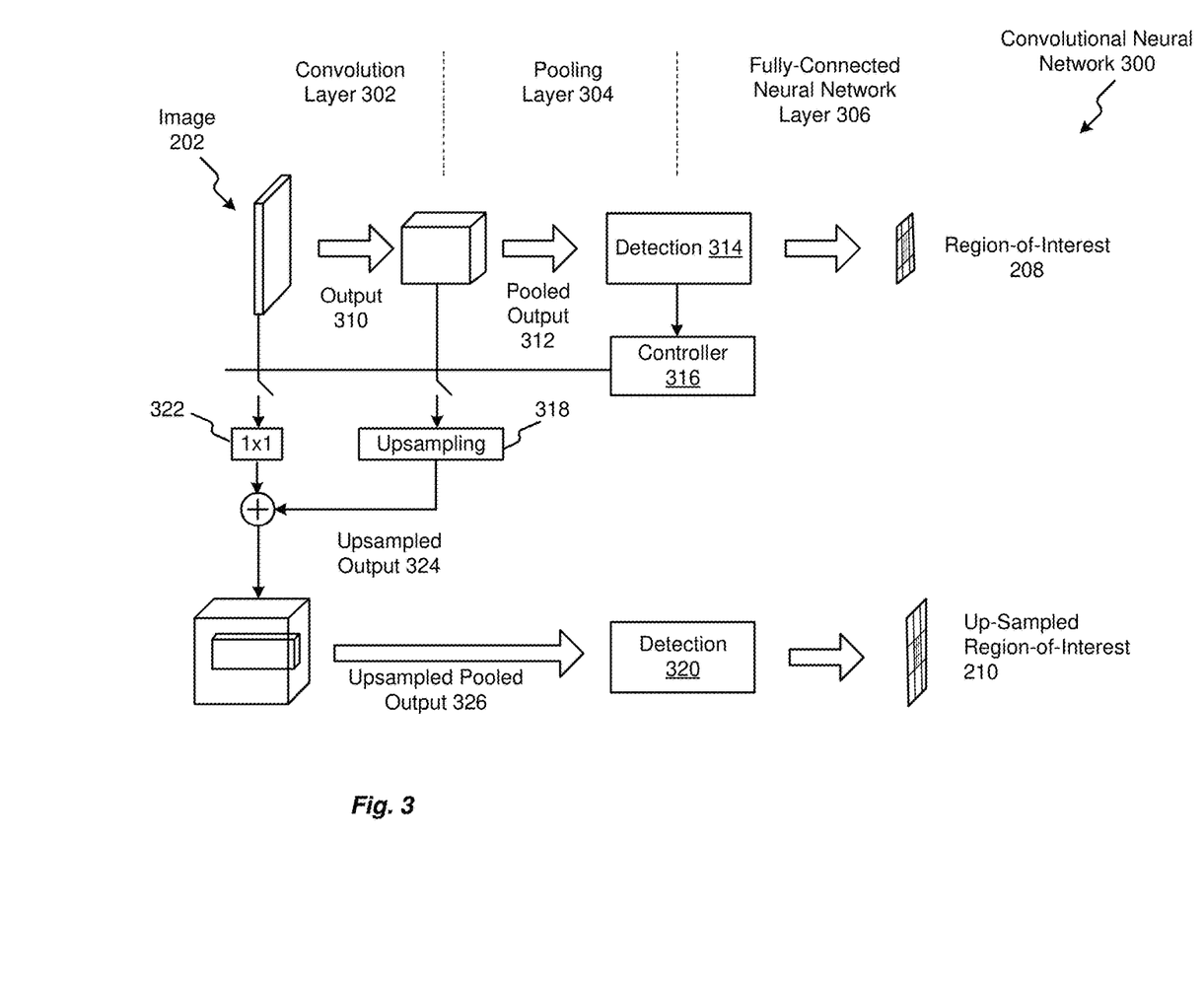
FIG. 3 depicts an example convolutional neural network with an instance of upsampling to generate an enhanced focus of a region-of-interest.

With respect to image recognition based on an image 202, FIG. 3 depicts an example convolutional neural network 300. Generally, the convolutional neural network 300 includes a convolution layer 302, a pooling layer 304, and a fully-connected neural network layer 306. With respect to training, the convolutional neural network 300 may be trained on a set of likely passenger-related items (such as discussed above).

In operation, the convolutional neural network 300 operates to provide image recognition for the image 202 based on filtering connections by proximity. For example, rather than connecting every input to every neuron in a given layer, such as with a neural network, a convolutional neural network 300 operates to restrict connections such that a neuron accepts inputs only from a small subsection of the layer before it. Thus, a neuron of a convolutional neural network 300 is responsible for image processing a portion of an image 202.

Convolutional layer 302 operates to process the image 202 (having width (x), height (y), and color (d) dimensions) into a group of overlapping tiles (for example, 3×3×3 tiles) as output 310. When the image 202 is in the form of a video, or a series of images, an additional dimension can be added to account for time (t). The output 310 provides values arranged in an array to numerically represent the content of each area of the image 202 (see, e.g., FIG. 2).

Pooling layer 304 receives the output 310 in a three or four dimensional array and produces a pooled output 312 that includes parts of the image 202 relating to a detection confidence metric indicative of an item 130 within a region-of-interest 208. Generally, a pooling layer operates to reduce the spatial size of an image representation. Pooling operates to produce a relational context of features from the original input volume, in effect reducing the spatial size of the image volume, where pixel length and width change but not the pixel depth. As a result, the number of parameters and computation by the convolutional network are also reduced.

Fully-connected neural network layer 306 functions as a detection layer 314 to produce a region-of-interest 208 relating to the image 202. The detection layer 314 preserves those regions-of-interest 208 having an elevated detection confidence metric representing a detected item 130.

Controller 316 operates to selectively upsample pooled output 312 to produce upsampled output 324 via upsampling 318 and filter 322, which operates to delineate and focus (for example, increase a pixel density) for a further segment of the image 202 via a region-of-interest 208. The upsampled output 324 can be further pooled to produce an upsampled pooled output 326 with increased resolution of a portion of a lower-resolution image, such as for example image 202.

The upsampled pooled output 326 further includes components and/or portions of the image 202 relating to a detection confidence metric indicative of an item 130, for example, within a region-of-interest 208, as further focused upon by the upsampled region-of-interest 210 produced by detection 320 from the upsampled pooled output 326. In this respect, resolution of the image 202 is enhanced to capture context from the pooled layer. In effect, upsampling the pooled output 326 provides a focus function to a desired portion of the image 202 for providing additional information for image recognition.

Additional upsampling stages, implementing additional convolutional, pooling, and upsampling processes can be implemented to iteratively focus portions of a region-of-interest 208 to arrive at an image recognition result. The convolutional neural network 300 may be executed via a vehicle control unit 110, as is described in detail with reference to FIG. 4.

Figure 4:
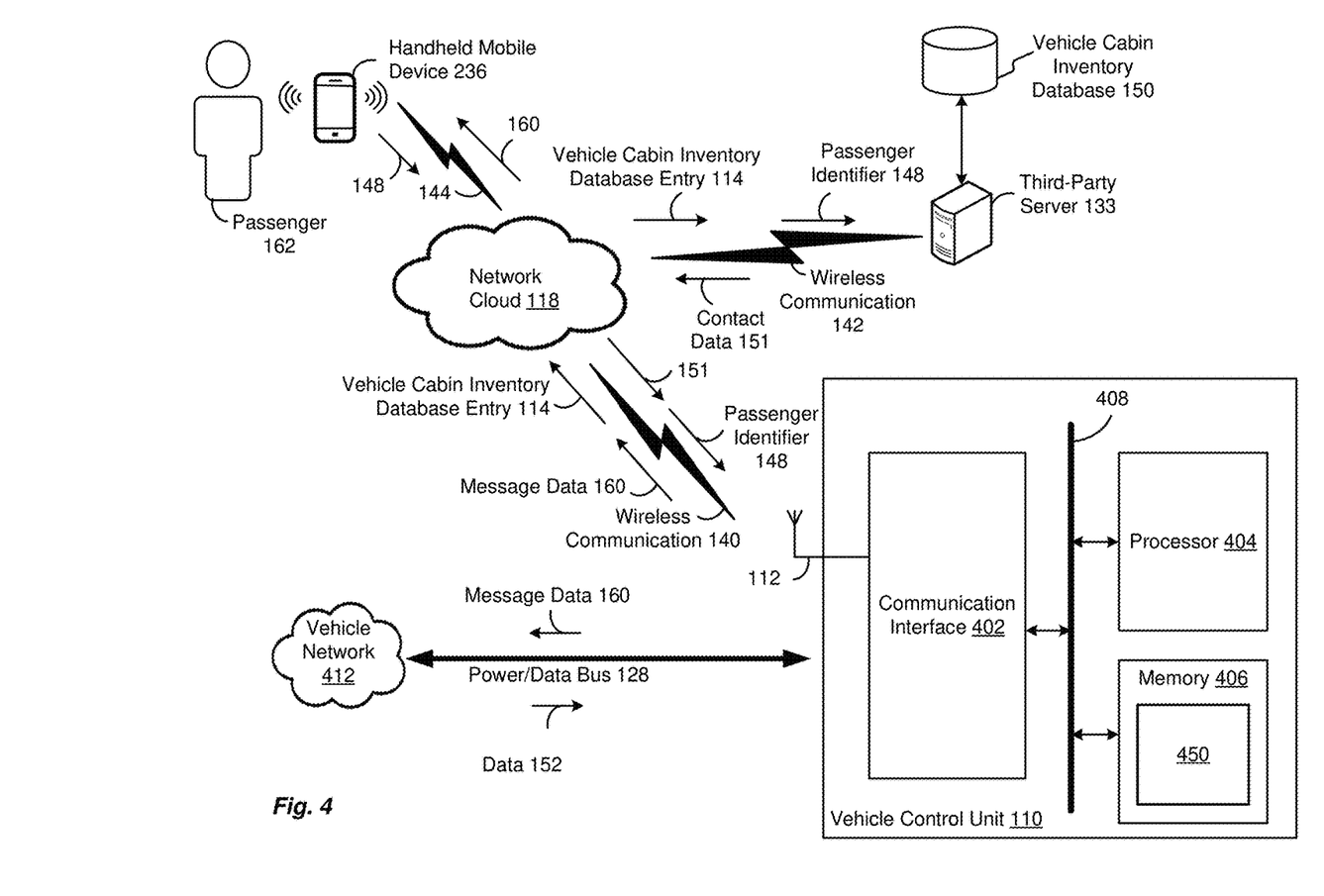
FIG. 4 is a schematic diagram of an embodiment of the vehicle control unit of FIG. 1.

FIG. 4 is a schematic diagram of a vehicle control unit 110 according to an embodiment of the disclosure. The vehicle control unit 110 is a suitable platform for implementing the disclosed embodiments as described herein. The vehicle control unit 110 may include a communication interface 402 for receiving and/or transmitting data; a processor, logic unit, or central processing unit (CPU) 404 to process the data; and memory 406 for storing data coupled to one another through a bus 408.

The processor 404 is implemented by hardware and software. The processor 404 may be implemented as one or more CPU chips, cores (e.g., as a multi-core processor), field-programmable gate arrays (FPGAs), application specific integrated circuits (ASICs), and digital signal processors (DSPs). The processor 404 is in communication with communication interface 402 and memory 406. The processor 404 can be a conventional central processing unit or any other type of device, or multiple devices, capable of manipulating or processing information. As may be appreciated, processor 404 may be a single processing device or a plurality of processing devices. Such a processing device may be a microprocessor micro-controller, digital signal processor, microcomputer, central processing unit, field programmable gate array, programmable logic device, state machine, logic circuitry, analogy circuitry, digital circuitry, and/or any device that manipulates signals (analog and/or digital) based on hard coding of the circuitry and/or operational instructions.

The memory (and/or memory element) 406 includes one or more disks, tape drives, and solid-state drives and may be used as an over-flow data storage device, to store programs when such programs are selected for execution, and to store instructions and data that are read during program execution. The memory 406 may be volatile and/or non-volatile and may be read-only memory (ROM), random access memory (RAM), ternary content-addressable memory (TCAM), and/or static random-access memory (SRAM). Furthermore, arrangements described herein may take the form of a computer program product embodied in one or more computer-readable storage mediums having computer-readable program code embodied, that is, stored, thereon. Any combination of one or more computer-readable media may be utilized. The computer-readable medium may be a computer-readable signal medium or a computer-readable storage medium.

The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a ROM, an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of the embodiments described herein, the computer-readable storage medium may be any tangible medium that can contain, or store, a program for use by or in connection with an instruction execution system, apparatus, or device. Program code embodied on a computer-readable medium may be transmitted using any appropriate medium, including but not limited to wireless, wireless, optical fiber, cable, Radio Frequency (RF), etc., or any suitable combination of the foregoing.

The memory 406 is capable of storing machine-readable instructions, such that the machine-readable instructions can include logic or algorithm(s) written in programming languages, and generations thereof, (e.g., 1GL, 2GL, 3GL, 4GL, or 5GL) such as, for example, machine language that may be directly executed by the processor 404, or assembly language, object-oriented programming (OOP) such as JAVA, Smalltalk, C++ or the like, conventional procedural programming languages, scripting languages, microcode, etc., that may be compiled or assembled into machine-readable instructions and stored on the memory 406. Alternatively, the machine-readable instructions may be written in a hardware description language (HDL), such as logic implemented via either a FPGA configuration or an ASIC, or the equivalents. Accordingly, the methods and devices described herein may be implemented in any conventional computer programming language, as pre-programmed hardware elements, or as a combination of hardware and software components.

Note that when the processor 404 includes more than one processing device, the processing devices may be centrally located (e.g., directly coupled together via a wireline and/or wireless bus structure) or may be distributively-located (e.g., cloud computing via indirect coupling via a local area network and/or a wide area network). Further note that when the processor 404 implements one or more of its functions via a state machine, analog circuitry, digital circuitry, and/or logic circuitry, the memory (and/or memory element) storing the corresponding operational instructions may be embedded within, or external to, the circuitry including the state machine, analog circuitry, digital circuitry, and/or logic circuitry.

The communication interface 402 generally governs and manages the data received via a vehicle network 412, such as message data 160 provided to the vehicle network 412 via the power/data bus 128, as well as receive data 152.

The vehicle cabin inventory database can be locally-stored as a local vehicle cabin inventory database 450 defined in the memory 406 and collocated with the vehicle control unit 110 for thick-client database operations. For example, to avoid data disruption by poor signal quality in wireless communication 140, a portion of the vehicle cabin inventory database 150 of FIG. 1 (not shown) may be downloaded, pushed and/or copied to the memory 406 as a local vehicle cabin inventory database 450.

In this respect, the vehicle control unit 110 may generate message data 160 for announcement based on contact data 151 for the passenger 162. The communication interface 402 may also operate to manage data flow with respect to external networks, such as represented by network cloud 118, through wireless communication 140. There is no restriction on the present disclosure operating on any particular hardware arrangement and therefore the basic features herein may be substituted, removed, added to, or otherwise modified for improved hardware and/or firmware arrangements as they may develop.

Figure 5:
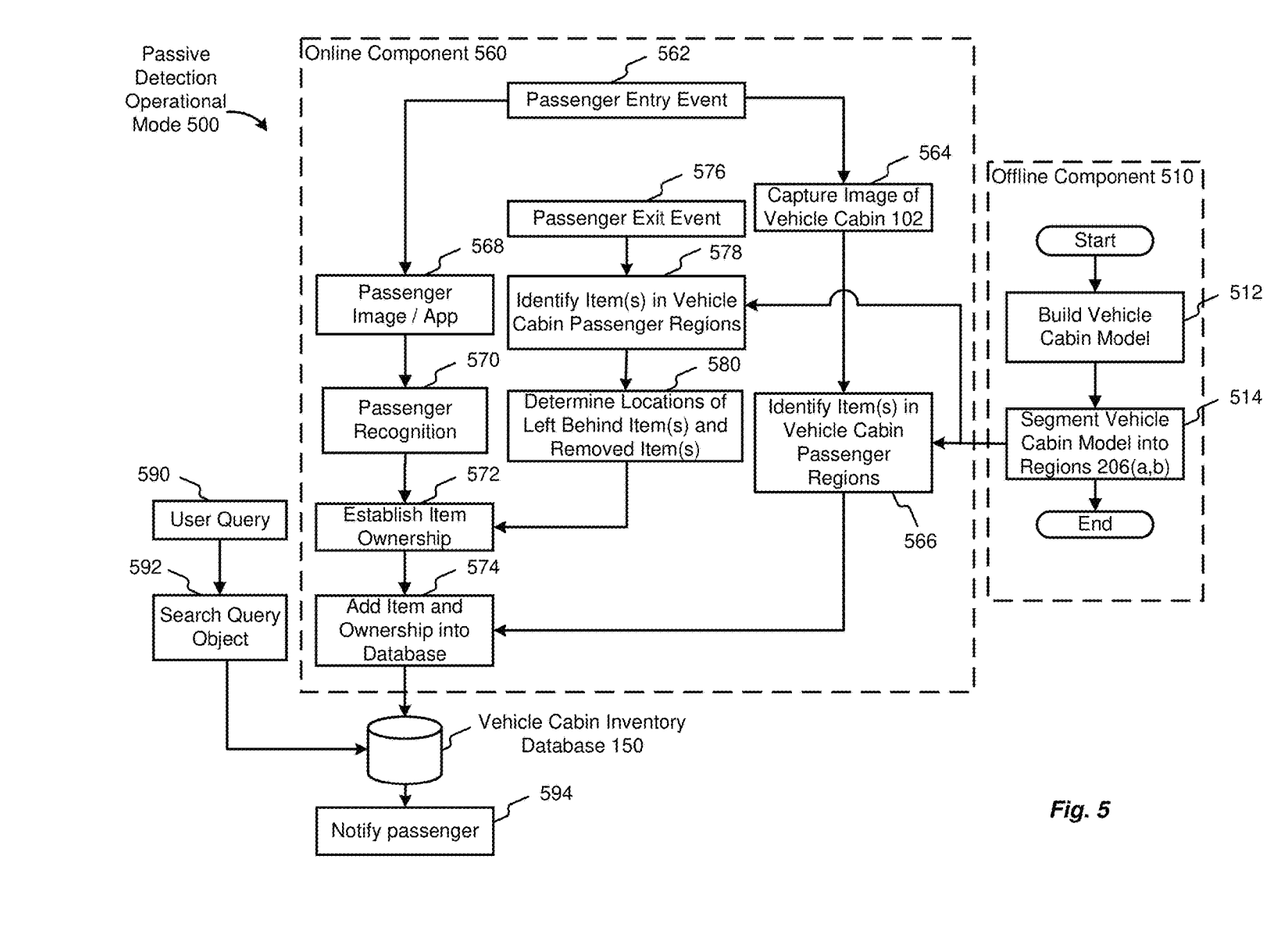
FIG. 5 is an example functional flowchart illustrating a passive detection operational mode of the vehicle control unit.

FIG. 5 is an example functional flowchart illustrating a passive detection operational mode 500 of the vehicle control unit 110. Generally, the passive detection operation mode 500 may operate on larger or delayed time intervals for detecting and identifying an item within a vehicle cabin passenger region 124, 126 and/or 127. In the passive detection operational mode 500, there is less demand for computing resources of the vehicle control unit 110, and as a result, a lesser power requirement from a vehicle 100 power source. The passive detection operational mode 500 may be used in electric and/or hybrid-electric vehicle environments to minimize electric power consumption by the vehicle control unit 110.

The passive detection operational mode 500 includes an offline component 510 and an online component 560. The offline component 510 can generate during downtime of the vehicle control unit 110, such as at block 512, to build a vehicle cabin training data for the vehicle cabin 102 that corresponds to vehicle cabin passenger regions 124, 126 and 127. Vehicle cabin training data may be generated for each camera device 120, 121, 122 and 123 based on the location and perspective of the camera device to the vehicle cabin 102. As may be appreciated, the training data can be used to train the convolutional neural network 300 for item recognition within the vehicle cabin 102.

At block 514, the operation segments the vehicle cabin model into regions 206(a,b), as illustrated by FIG. 2 and described in detail above. The segmented vehicle cabin model is used in the online component 560 for item identification initiated by the example of (1) a passenger entry event 562 and (2) a passenger exit event 576. As may be appreciated, the period of time between the passenger entry event 562 and the passenger exit event 576 can be taken at smaller sampling time intervals for item detection and identification in vehicle cabin passenger regions based on power and resource availability of the vehicle control unit 110.

In the online component 560, the passenger entry event 562 subsequently initiates item identification and passenger identification. An example of a passenger entry event 562 includes, for example, opening of a passenger door accompanied by a period of time for a passenger to be settled in a seat.

In block 564, the passive detection operational mode 500 captures an image of the vehicle cabin 102, and at block 566, detects and identifies an item and/or items in the vehicle cabin passenger regions 124, 126 and/or 127.

Passenger identification begins at block 568, in which a passenger image is captured and/or application is accessed, and at block 570, generates a passenger recognition and passenger identifier.

As may be appreciated, passenger recognition can be based on facial and/or biometric recognition techniques using Internet-sourced recognition data. For example, facial recognition capability can be developed and made available from social networking data resources from a user image postings coupled with biographical information. Examples of social networking resources may include, without limitation, Facebook, Linkedin, Google+, YouTube, Pinterest, Instagram, Tumblr, etc.

As also may be appreciated, passenger recognition can be based on a passenger's contact data 151 from their client application used to request a vehicle-for-hire, as noted above in reference to FIG. 1.

At block 572, the identified item of block 566 is associated with the passenger that was identified, or recognized, in block 570. At block 574, the vehicle cabin inventory database 150 is updated with an entry based on the identified item associated with the passenger identifier.

At block 576, a passenger exit event triggers identifying an item or items in the vehicle cabin passenger regions 124, 126 and/or 127. In contrast with the item identification from the passenger entry event of block 562, items may have been relocated to other vehicle cabin passenger regions or removed altogether, such as being returned by the passenger into their clothing or accessories. At block 578, the remaining or removed items are identified. At block 580, the locations of the remaining items and last known locations of the removed items are determined. At block 572, the remaining or removed items are associated with the passenger, and at block 574, the vehicle cabin inventory database 150 is updated to reflect the status of the remaining or removed items.

At block 594, message data is generated that includes the entry relating to the identified item or items within the vehicle cabin passenger region to notify the passenger as is discussed in detail above. Because of the time span between the passenger entry event at block 562 and the passenger exit event at block 576, scenarios with multiple passengers may not associate identified items with individual passengers, but generally associate identified items with the group of passengers at large.

Also, the vehicle cabin inventory database 150 may be accessed at block 590 via a user query. In this regard, a passenger, vehicle operator, or vehicle-for-hire service may at block 592 search for a query object in the vehicle cabin inventory database 150, and at block 594 generate message data to notify the passenger, as well as a vehicle operator and/or the vehicle-for-hire service.

Figure 6:
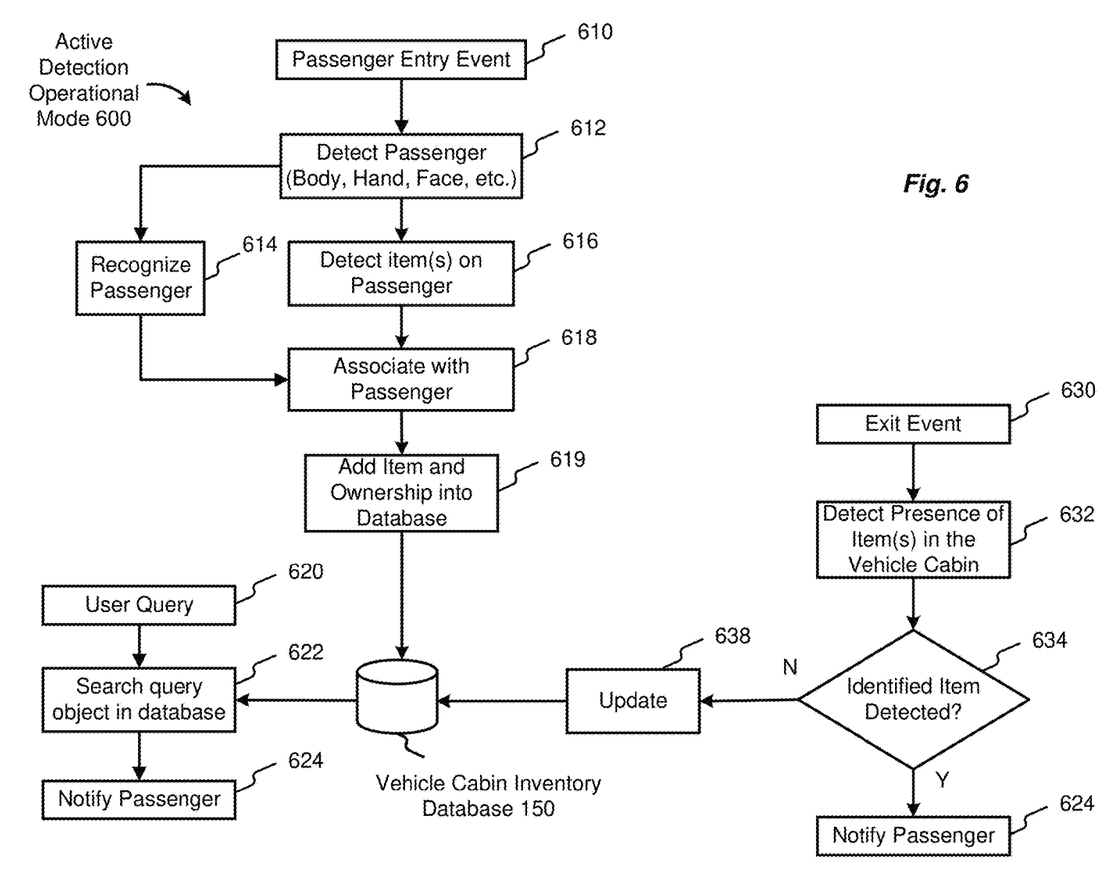
FIG. 6 is an example functional flowchart illustrating an active detection operational mode of the vehicle control unit.

FIG. 6 is an example functional flowchart illustrating an active detection operational mode 600 of the vehicle control unit 110. Generally, the active detection operation mode 600 may operate on a continuous or near-continuous basis to associate an identified item with a passenger.

At block 610, when a passenger entry event occurs, the passenger is detected at block 612 and identified at block 614 through facial recognition and/or biometric inputs as described above, or through contact data 151 accessed via a client application of the passenger. Also at block 612, passenger hand movements, pockets, purses, etc., may be detected at block 616 for observation of an item or items on the passenger that may be removed by the passenger, or unintentionally falls out of the pocket and/or purse.

At block 618, the identified item is associated with the passenger identified in block 614, and at block 619, the vehicle cabin inventory database 150 is updated with an entry based on the identified item associated with the passenger identifier.

At block 630, a passenger exit event triggers at block 632 detecting a presence of an item or items in the vehicle cabin passenger regions 124, 126 and/or 127. When the identified item is detected at block 634, message data is generated that includes the entry relating to the identified item or items within the vehicle cabin passenger region to notify the passenger as discussed in detail above. If at block 634 the identified item is not detected, such as having been returned by the passenger into their clothing or accessories, vehicle cabin inventor database 150 is updated at block 638 to reflect the updated status.

Also, the vehicle cabin inventory database 150 may be accessed at block 620 via a user query. In this regard, a passenger, vehicle operator, or vehicle-for-hire service may at block 622 search for a query object in the vehicle cabin inventory database 150, and at block 624 generate message data to notify the passenger, as well as a vehicle operator and/or the vehicle-for-hire service regarding the status of an identified item.

Figure 7:
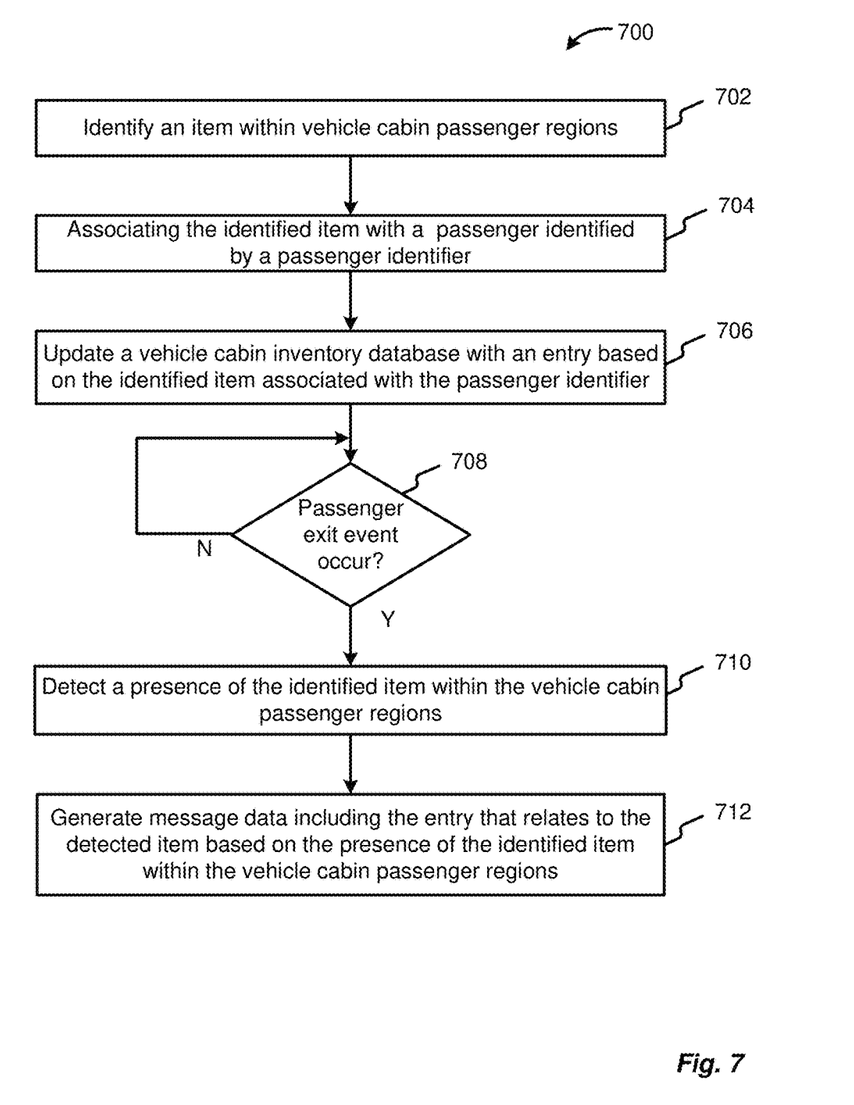
FIG. 7 is a flowchart illustrating an embodiment of a method for mitigating passenger-related item loss in a travel-for-hire context.

FIG. 7 is a flowchart illustrating an embodiment of a method 700 for passenger-related item loss mitigation. In an embodiment, the method 700 is implemented in a vehicle control unit, and used, when, for example, a passenger item is identified within a vehicle cabin passenger region.

At block 702, an item is identified within vehicle cabin passenger regions. As may be appreciated, image processing techniques can be used to sense changes in an environment. In a shared vehicle environment image recognition can be used to detect environmental changes, such as an item on a passenger seat that was not there initially.

Also, image recognition processing may include upsampling techniques to further delineate and focus upon vehicle passenger regions based on a detection confidence metric. For example, upon capturing an image of vehicle cabin regions, a region-of-interest of the image can be identified based on respective detection confidence metrics among the vehicle passenger regions (for example, being indicative of an item in a vehicle passenger region). Generally, machine learning techniques for image recognition are trained based on a developed set of modeling data (such as a vehicle cabin image data and item image data for a set of items). To improve the image processing, such as by a deep learning machine technique (e.g., convolutional neural network, actor-critic machine learning, reinforcement learning, etc.), the region-of-interest can be upsampled to produce an upsampled region-of-interest, and image recognition may be performed on the upsampled region-of-interest to identify the item within the vehicle cabin passenger regions.

At block 704, an association is made with the identified item and a passenger identified by a passenger identifier. The association can be based on item proximity to a passenger location within the vehicle cabin. In another example, the association can be based on tracking data having an origin collocated with the passenger. Generally, passenger identifiers can be provided as discussed above. Also, biometric identification may be sensed or received from the passenger upon ingress to a vehicle, such as iris recognition data, fingerprint recognition data, facial recognition data, voice recognition data, etc. Further, other forms of passenger identifiers may be used based on verification through blockchain architectures or techniques. Other identification data can be received via a passenger's handheld mobile device.

At block 706, a vehicle cabin inventory database can be updated with an entry based on the identified item associated with the passenger identifier. In this manner, a near real-time inventory can be generated as relating to items identified within vehicle cabin passenger regions for multiple passengers. Driver and/or operator items can be excluded because of the nature of the region being related to a driver (such as the driver's seat), as well as items consistently identified as being present within the vehicle over time (such as, travel mugs, handheld mobile device, etc.).

At block 708, the method determines whether a passenger exit event occurs. Vehicle sensor devices, such as camera device 120 and camera device 122, can further include devices for monitoring ambient conditions of the vehicle, as well as internal conditions of the vehicle cabin 102. For example, the vehicle sensor devices can include door actuation sensor devices that can provide vehicle door sensor data relating to a passenger exit and/or entry event, as well as passenger seat sensor devices that can provide passenger seat sensor data that can also indicate a passenger exit and/or entry event. Other examples of vehicle sensor devices can include vehicle-lock sensor devices that can indicate a lock-state of a vehicle door via vehicle-lock sensor data, and Global Positioning System (GPS) devices that can generate destination arrival data indicative of an exit and/or entry event. In block 710, the continued presence of the identified item within the vehicle cabin passenger regions.

At block 712, message data is generated, and includes the database entry relating to the detected item based on the presence of the identified item within the vehicle cabin passenger regions at the time of the exit event. As may be appreciated, the message data can be verbally announced via an announcement device, such as a vehicle speaker, a vehicle display, etc. In addition to, or alternatively, the message data can be announced by transmitting a text message based on the passenger identifier for receipt by a handheld mobile device, can be announced by transmitting the message data based on the passenger identifier for receipt by a client application of the handheld mobile device, and/or can be announced by transmitting the message data based on the passenger identifier as a universal resource locator (URL) link for receipt by a user device. In this respect, a mobile handheld device can be directed to a website to inform the passenger of the item left behind, and the opportunity to retrieve or make arrangements to retrieve the item.

A method of mitigating passenger-related item loss in a travel-for-hire context includes means for associating the identified item with a passenger identified by a passenger identifier, means for updating a vehicle cabin inventory database with an entry based on the identified item associated with the passenger identifier, means for detecting a presence of the identified item within the vehicle cabin passenger regions when a passenger exit event occurs, and means for generating message data including the entry that relates to the detected item based on the presence of the identified item within the vehicle cabin passenger regions.

A vehicle control unit for in-vehicle tracking of an item including memory means containing instructions, and processor means coupled to the memory, the processor means configured to execute the instructions stored in the memory means to cause the processor means to identify an item within vehicle cabin passenger regions, associate the identified item with a passenger identified by a passenger identifier, update a vehicle cabin inventory database with an entry including the identified item associated with the passenger identifier, detect a presence of the identified item within the vehicle cabin passenger regions when a passenger exit event occurs, and generate message data with the entry relating to the detected item based on the presence of the identified item within the vehicle cabin passenger regions.

A method of mitigating passenger-related item loss including means for identifying, via image recognition, an item within a vehicle cabin passenger region as a passenger-related item, means for associating the identified item with a passenger identified by a passenger identifier when the identified item is a passenger-related item, means for updating a vehicle cabin inventory database entry associated with the passenger identifier with the passenger-related item, means for detecting a presence of the passenger-related item within the vehicle cabin passenger regions when a passenger exit event occurs, means for generating message data relating to the detected item based on the presence of the passenger-related item within the vehicle cabin passenger region and based on the vehicle cabin inventory database, and transmitting the message data for alerting the passenger identified by the passenger identifier.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other items shown or discussed as coupled may be connected with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method of mitigating passenger-related item loss in a travel-for-hire context, the method comprising:
   identifying an item within a vehicle cabin passenger region;
   associating the identified item with a passenger identified by a passenger identifier;
   updating a vehicle cabin inventory database with a database entry based on the identified item associated with the passenger identifier;
   in response to an occurrence of a passenger exit event, detecting a presence of the identified item within the vehicle cabin passenger region; and
   generating message data including the entry that relates to the identified item based on the presence of the identified item within the vehicle cabin passenger region.

2. The method of claim 1, wherein the identifying the item comprises:
   capturing an image of the vehicle cabin passenger region;
   identifying a region-of-interest of the image, wherein the region-of-interest is based on a detection confidence metric relating to the vehicle cabin passenger region;
   upsampling the region-of-interest to produce an upsampled region-of-interest, the upsampled region-of-interest to promote image recognition; and
   performing image recognition of the upsampled region-of-interest of the image to identify the item within the vehicle cabin passenger region.

3. The method of claim 2, wherein the capturing the image of the vehicle cabin passenger region occurs upon a passenger entry event.

4. The method of claim 1, wherein the identifying the item with the vehicle cabin passenger region includes verifying the identified item as a passenger-related item.

5. The method of claim 1, further comprising verbally announcing the message data via an announcement device.

6. The method of claim 1, further comprising announcing the message data.

7. The method of claim 6, wherein the announcing the message data comprises at least one of:
   transmitting a text message based on the passenger identifier for receipt by a handheld mobile device;
   transmitting the message data based on the passenger identifier for receipt by a client application of the handheld mobile device; or
   transmitting the message data based on the passenger identifier as a universal resource locator (URL) link for receipt by a user device.

8. The method of claim 1, wherein the passenger exit event is based on at least one of:
   camera device data; or
   vehicle door sensor data.

9. A vehicle control unit for in-vehicle tracking of an item, comprising:
   a memory containing instructions; and
   a processor coupled to the memory, the processor configured to execute the instructions stored in the memory to cause the processor to:
      identify an item within a plurality of vehicle cabin passenger regions;
      associate the identified item with a passenger identified by a passenger identifier;
      update a vehicle cabin inventory database with an entry including the identified item associated with the passenger identifier;
      in response to an occurrence of a passenger exit event, detect a presence of the identified item within the plurality of vehicle cabin passenger regions; and
      generate message data with the entry relating to the identified item based on the presence of the identified item within the plurality of vehicle cabin passenger regions.

10. The vehicle control unit of claim 9, comprising further instructions stored in memory to cause the processor to identify the item by:
    capturing an image of a vehicle cabin passenger region of the plurality of vehicle cabin passenger regions;
    identifying a region-of-interest of the image, wherein the region-of-interest is based on a detection confidence metric relating to the vehicle cabin passenger region of the plurality of vehicle cabin passenger regions;
    upsampling the region-of-interest to produce an upsampled region-of-interest, the upsampled region-of-interest to promote image recognition; and
    performing image recognition of the upsampled region-of-interest of the image to identify the item within the vehicle cabin passenger region.

11. The vehicle control unit of claim 9, wherein the identifying the item within the plurality of vehicle cabin passenger regions includes verifying the identified item as a passenger-related item.

12. The vehicle control unit of claim 9, comprising further instructions stored in memory to cause the processor to verbally announce the message data via a user interface.

13. The vehicle control unit of claim 9, comprising further instructions stored in the memory to cause the processor to transmit the message data by at least one of:
    a text message based on the passenger identifier for receipt by a handheld mobile device;
    a client application based on the passenger identifier for receipt by a client application of the handheld mobile device; or
    a universal resource locator (URL) link for receipt by a user device.

14. The vehicle control unit of claim 9, wherein the passenger exit event is based on at least one of:
    camera device data; or
    vehicle door sensor data.

15. The vehicle control unit of claim 9, wherein the passenger identifier comprises at least one of:
    a username;
    an international mobile equipment identity (IMEI) number; or
    an electronic serial number (ESN).

16. A method of mitigating passenger-related item loss, the method comprising:
    identifying, via image recognition, an item within vehicle cabin passenger regions as a passenger-related item;
    associating the item with a passenger identified by a passenger identifier when the item is a passenger-related item;

updating a vehicle cabin inventory database entry with the passenger identifier and the passenger-related item;

detecting, in response to an occurrence of a passenger exit event, a presence of the passenger-related item within the vehicle cabin passenger regions;

generating message data based on the presence of the passenger-related item within the vehicle cabin passenger regions and based on the vehicle cabin inventory database entry; and transmitting the message data for alerting the passenger identified by the passenger identifier.

17. The method of claim 16, wherein the identifying the item comprises:

capturing an image of the vehicle cabin passenger regions;

identifying a region-of-interest of the image, wherein the region-of-interest is based on a detection confidence metric relating to within the vehicle cabin passenger regions;

upsampling the region-of-interest to produce an upsampled region-of-interest, wherein the upsampled region-of-interest provides an enhanced focus to promote image recognition; and performing the image recognition of the upsampled region-of-interest of the image to identify the item within the vehicle cabin passenger regions.

18. The method of claim 16, wherein the transmitting the message data comprises at least one of:

transmitting a text message based on the passenger identifier for receipt by a handheld mobile device;

transmitting the message data based on the passenger identifier for receipt by a client application of the handheld mobile device; or transmitting the message data based on the passenger identifier as a universal resource locator (URL) link for receipt by a user device.

19. The method of claim 16, wherein the passenger exit event is based on at least one of:

camera device data; or vehicle door sensor data.

20. The method of claim 16, wherein the passenger identifier comprises at least one of:

a username;

an international mobile equipment identity (IMEI) number; or an electronic serial number (ESN).

* * * * *